United States Patent
Tripp et al.

[11] Patent Number: 5,986,273
[45] Date of Patent: Nov. 16, 1999

[54] ULTRAVIOLET RADIATION SENSOR

[76] Inventors: James E. Tripp, General Delivery, Warminister, Ontario, Canada, L0K 2G0; Shawn P. Morrison, 321 Nelson St., Barrie, Ontario, Canada, L4M 5P6

[21] Appl. No.: 09/020,414

[22] Filed: Feb. 9, 1998

[51] Int. Cl.⁶ ........................................ G01J 1/38
[52] U.S. Cl. ........................................ 250/474.1
[58] Field of Search ........................... 250/474.1

[56] References Cited

U.S. PATENT DOCUMENTS

| | | | |
|---|---|---|---|
| 3,830,224 | 8/1974 | Vanzetti | 128/2 |
| 3,951,133 | 4/1976 | Reese | 128/2 |
| 3,998,210 | 12/1976 | Nosari | 128/2 |
| 4,064,872 | 12/1977 | Caplan | 128/2 |
| 4,344,909 | 8/1982 | DeBlauwe | 264/230 |
| 4,388,139 | 6/1983 | Fuller | 156/307.5 |
| 4,459,046 | 7/1984 | Sprig | 374/162 |
| 4,467,278 | 8/1984 | Toth | 324/95 |
| 4,863,282 | 9/1989 | Rickson | 374/162 |
| 5,282,683 | 2/1994 | Brett | 374/150 |
| 5,482,373 | 1/1996 | Hutchinson | 374/141 |
| 5,612,541 | 3/1997 | Hoffmann et al. | 250/474.1 |

OTHER PUBLICATIONS

South Seas Trading Company Internet Advertisement, Retrieved from Internet Dec. 29, 1997.
PPG Products Internet Advertisement, Retrieved from Internet Dec. 9, 1997.
Journal Of Applied Polymer Science, vol. 64, No. 5, pp. 841–848, May 2, 1997.

*Primary Examiner*—Constantine Hannaher
*Assistant Examiner*—Albert Gagliardi
*Attorney, Agent, or Firm*—Merek & Voorhees

[57] ABSTRACT

An ultraviolet radiation sensor that may be worn on the skin to indicate exposure of the skin to ultraviolet radiation. The sensor comprises a transparent semi-permeable membrane having an upper and a lower surface, an adhesive capable of releasably adhering the semi-permeable membrane to human skin, and an indicator to visually indicate exposure to ultraviolet radiation. When the sensor is attached to human skin, by way of the adhesive, it allows for the migration of water vapour and gases from the surface of the skin through the sensor and into the atmosphere.

14 Claims, 2 Drawing Sheets

ULTRAVIOLET RADIATION SENSOR

FIELD OF THE INVENTION

This invention relates to ultraviolet radiation sensors, and particularly such sensors that may be worn on the skin to indicate the skin's level of exposure to ultraviolet radiation.

BACKGROUND OF THE INVENTION

Exposure to ultra violet radiation can cause a wide range of deleterious effects in human skin, including dehydration, burning, premature aging, and discolouration. In addition, it has been widely accepted and documented that excessive exposure to ultraviolet radiation can be carcinogenic in humans. Exposure to ultraviolet radiation is of a particular concern for individuals that spend a significant amount of time outside and exposed to the sun, and those having fair completions and who are less tolerant to the sun's ultraviolet rays. In addition, damage to the earth's ozone layer and its ability to filter out ultraviolet radiation has further raised the concern over the harmful effects that exposure to ultraviolet radiation may have.

For the above reasons a variety of different devices and skin preparations have been developed in order to limit exposure to solar radiation. So called "sunscreen" clothing has been developed that filters or blocks ultraviolet radiation. In addition, significant advances have been made in the development and commercialization of topical sunscreen preparations that may be applied to the skin in order to provide protection from ultraviolet rays.

While sunscreen preparations are, to varying degrees, reasonably effective in filtering out harmful radiation and limiting the skin's exposure to the sun, they are limited with respect to their duration of usefulness, and in many cases may also be worn away through physical activity, bathing or swimming activities. As a result, sunscreens must typically be re-applied on a regular basis, the frequency of which may increase depending upon the physical activity of an individual. In some situations, individuals are engaged in activities that prevent them from re-applying sunscreen on a regular basis. In other cases individuals merely forget to apply or re-apply sunscreen. In yet other situations, an individual may inappropriately gauge the level of sunscreen preparation necessary at any particular time of the day, or on any day. That is, commercially available sunscreen preparations are rated on what is commonly referred to as a sunscreen protection factor (SPF) scale. Generally the higher the SPF factor the greater the sunscreen protection that is provided. However, often individuals are unaware of the intensity of the sun's rays during a particular time of day, or with changing weather conditions, and fail to apply sunscreen having an adequate SPF factor. The natural characteristics of the skin of different individuals and the rate at which different individuals perspire will result in the effectiveness of sunscreens varying dramatically for different people. Finally, it is often not appreciated by individuals that ultraviolet radiation can cause degradation of a sunscreen preparation requiring further application regardless of perspiration, swimming or physical activity.

There is therefore a need for a device that is capable of indicating when an individual has been exposed to ultraviolet radiation and the level of ultraviolet radiation exposure. Such a device would allow an individual to know when exposure to sunlight should be terminated or when further sunscreen preparations should be applied.

SUMMARY OF THE INVENTION

The invention therefore provides an ultraviolet radiation sensor that may be worn by an individual on his or her skin to indicate when there has been ultraviolet radiation exposure and the amount of exposure. The sensor may also be provided with a means to receive and absorb a sunscreen preparation such that the individual knows when to re-apply further sunscreen.

Accordingly, in one of its aspects the invention provides an ultraviolet radiation sensor that may be worn on the skin to indicate exposure of the skin to ultraviolet radiation, the sensor comprising; a transparent semi-permeable membrane having an upper and a lower surface; an adhesive capable of releasably adhering said semi-permeable membrane to human skin; and, indicator means to visually indicate exposure to ultraviolet radiation, wherein said sensor, when attached to human skin by way of said adhesive, allowing for the migration of water vapour and gases from the surface of the skin through said sensor and into the atmosphere.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
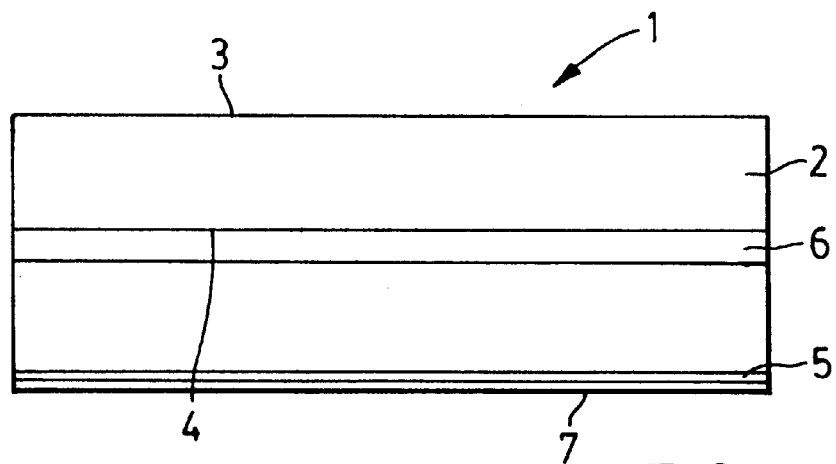
FIG. 1 is a side view of the ultraviolet radiation sensor pursuant to the present invention.
Figure 2:
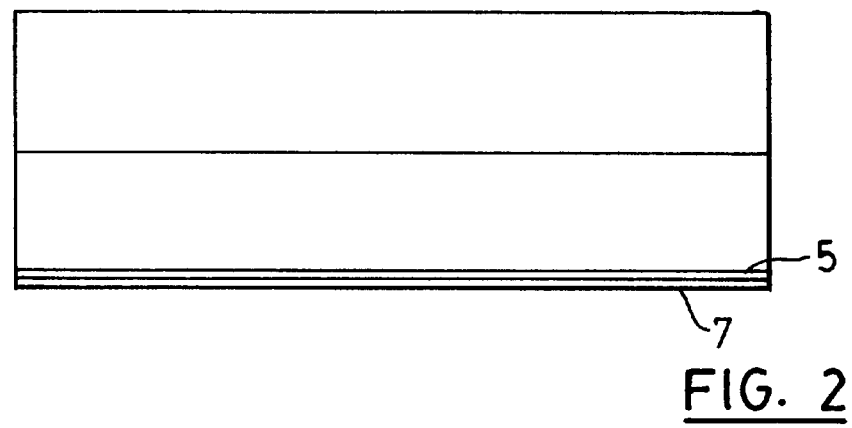
FIG. 2 is a side view of an alternate embodiment of the present invention.
Figure 3:
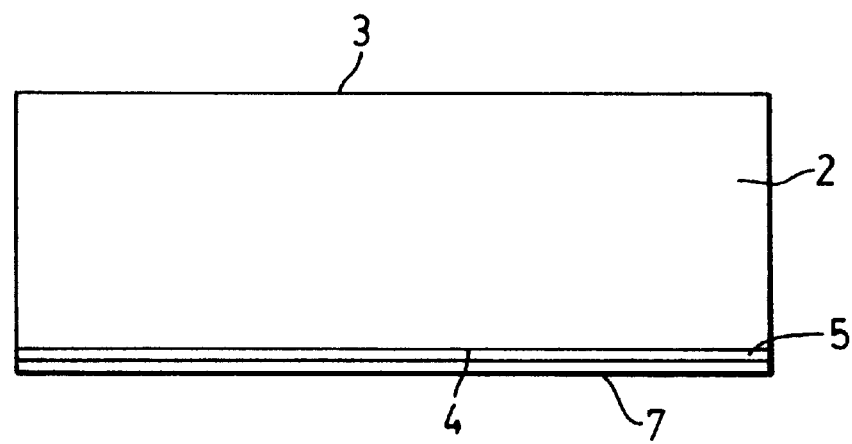
FIG. 3 is a side view of a further embodiment of the invention.
Figure 4:
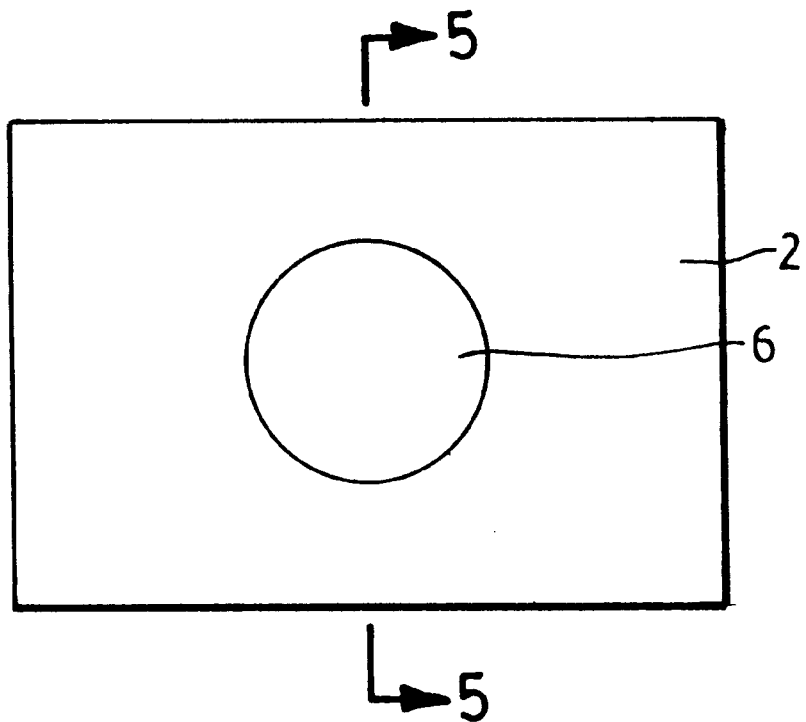
FIG. 4 is a plan view of the embodiment shown in FIG. 2.
Figure 5:
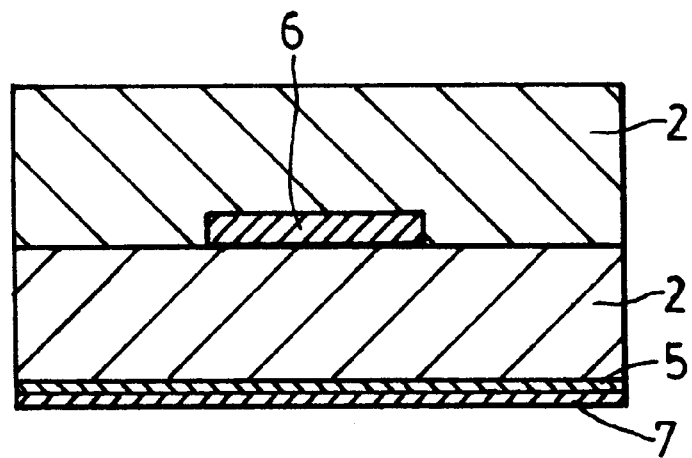
FIG. 5 is a sectional view taken along the line 5—5 of FIG. 4.

The ultraviolet radiation sensor according to the present invention is shown in the attached drawings and noted generally by reference number 1. Sensor 1 is comprised generally of a transparent semi-permeable membrane 2, an adhesive 5 for releasably adhering membrane 2 to human skin, and indicator means 6 to visually indicate exposure to ultraviolet radiation. Semi-permeable membrane 2 is generally a thin flexible membrane having an upper surface 3 and a lower surface 4. The precise configuration of sensor I may be varied considerably. For example, FIGS. 1, 2 and 3 show three different embodiments of the invention that could be constructed. In FIG. 1, indicator means 6 is positioned or "sandwiched" between two separate layers of semi-permeable membrane 2 with adhesive 5 being applied to the bottom surface of the lower membrane. Alternately, in FIG. 2, indicator means 6 is in the shape of a small disk positioned between, and completely encompassed by, two separate layers of membrane 2. As in FIG. 1, adhesive 5 is located on the lower surface of the bottom membrane. In yet the further embodiment shown in FIG. 3, indicator means 6 is physically disbursed throughout semi-permeable membrane 2 to form a unitary layered material. Adhesive 5 is applied to lower surface 4 of the membrane.

Since one of the primary applications of the present invention is for use on human skin in order to provide a means to indicate when an individual has been exposed to a pre-determined level of ultraviolet radiation, in the preferred embodiment semi-permeable membrane 2 is constructed as such that it closely simulates the characteristics of human skin. That is, preferably membrane 2 will allow for the migration of water vapour, carbon dioxide and other gases through it while preventing the transmission of water in a liquid form. In this manner when sensor 1 is applied to human skin the skin will be allowed to "breathe" such that perspiration and carbon dioxide will migrate from the skin through sensor 1 into the atmosphere. At the same time liquid water will be prevented from penetrating the membrane, therefore reducing the likelihood of the bond between adhesive 5 and the skin being disrupted. In addition, membrane 2 should have the further characteristics of being non-toxic, hypo-allergenic, and resistant to the effects of ultraviolet radiation. It will be appreciated that a wide variety of different polymers and materials could potentially be used for the formation of membrane 2. A number of such membranes have been developed for use as "artificial skin" and are currently in use in the medical profession to treat burn victims and those requiring skin grafts. An example of a commercially available product that has been found to perform adequately as semi-permeable membrane 2 is a product sold under the trademark TEGA-DERM by the 3M Company.

So as to visually indicate when it has been exposed to ultraviolet radiation, indicator means 6 preferably includes photochromic ink or dye. The photochromic ink reversibly alters colour upon exposure to sources of ultraviolet light. In general such photochromic inks function through molecular excitation as a result of exposure to ultraviolet light. That is, when exposed to ultraviolet light molecular excitation of the ink causes a change in its colour. Typically such inks can be activated by ultraviolet light having a wavelength of from 300 to 360 nanometres over a duration of 20 to 60 seconds. When the stimulus or source of ultraviolet light is removed so is the source of molecular excitation for the photochromic ink allowing the ink to return to a state of rest and to its original colour or colourless format.

Photochromic inks or dyes are available in a number of base colours and can typically be mixed in order to form a variety of colours depending upon a specific application. In addition, different pigments and different types of photochromic inks can be constructed so as to react and change colour after a specific duration or level of ultraviolet exposure. Accordingly, through the choice of a particular photochromic ink the colour exhibited by indicator means 6 when exposed to ultraviolet light can be chosen so as to best suit a desired application. For example, while certain coloured indicators may be appropriate for fair skinned individuals, darker skinned individuals may require the use of a different coloured photochromic ink. In addition, in some cases it may be desirable to utilize a photochromic ink that changes colour rapidly upon exposure to ultraviolet light while in other cases it may be desirable to utilize a photochromic ink that changes colour only after a predetermined level of ultraviolet exposure.

It will be appreciated by those skilled in the art that a wide variety of commercially available photochromic inks and dyes are available that could be utilized pursuant to the present invention. A particular commercially available product that has been found to fulfil the requirements of the invention is sold under the trademark PHOTOSOL by PPG Industries, Inc. It will also be appreciated that through the use of photochromic inks, indicator means 6 will react to exposure to ultraviolet light and do not require any significant heating to be activated. This is an important feature of the invention since the harmful effects of ultraviolet radiation exposure can be experienced in cold environments or in winter months where exposed skin may in fact be cool or cold but may still be damaged through exposure to ultraviolet radiation.

Depending upon the particular configuration of sensor 1, the carrier layer of indicator means 6 that retains the photochromic ink may take one of a number of different physical configurations. For example, the carrier layer may be comprised of a semi-permeable material, such as cellulose, that is capable of absorbing and carrying the photochromic ink. The carrier may also be in the form of a mesh or perforated layer. Alternatively, the carrier layer may be comprised of a polymer that has photochromic ink dispersed throughout its polymeric structure. An example of a commercially available polymeric material containing photochromic ink that may be used pursuant to the requirements of the present invention is sold by CIT Industries under the trademark PLASTISOL. In yet a further alternative, the photochromic ink may be added to the semi-permeable membrane 2 during its manufacturing process with the photochromic ink dispersed throughout membrane 2, as shown in FIG. 3. In this instance the semi-permeable membrane and indicator means 6 comprise a unitary and uniform layer of material. It will be appreciated that in this embodiment membrane 2 will itself effectively change colour when exposed to ultraviolet radiation in the manner as discussed above. In any event, the carrier layer and/or the membrane should remain semi-permeable to allow the skin below sensor 1 to "breathe".

In use, sensor 1 would typically be applied to the skin or a piece of clothing through the use of adhesive 5. Since adhesive 5 must be capable of adhering sensor 1 to skin, the adhesive should be hypo-allergenic and should also allow for the passage of perspiration therethrough. In addition, adhesive 5 should be such that it provides for simple and easy removal of sensor 1 from the skin without significant damage to the upper epidermal layer. A wide variety of such adhesives are readily available and in common use in the medical industry. In order to assist in the packaging and application of sensor 1, and to protect adhesive 5, in the preferred embodiment a thin backing layer 7 is utilized to cover the adhesive. Backing layer 7 would typically be compromised of a layer of cellulose or plastic that can be peeled away from the adhesive immediately prior to use, much the same as the backing on a standard bandage is removed to expose the adhesive.

In the preferred embodiment semi-permeable membrane 2 also exhibits the absorbent characteristics of sunscreen preparations on human skin such that it in effect mimics the manner in which sunscreen is absorbed by the skin. The application of a topical sunscreen preparation on the surface of sensor 1 so that it is received and absorbed into membrane 2 will therefore have the effect of preventing the photochromic ink from being exposed to ultraviolet light, or at least partially shielding the ink from ultraviolet light. Depending upon the nature of the topical sunscreen preparation and its related sunscreen protection factor, varying amounts of ultraviolet light will effectively be filtered by the sunscreen and prevented from reaching indicator means 6. As membrane 2 generally mimics the characteristics of human skin in so far as it is able to retain a sunscreen preparation and allow perspiration to flow therethrough, through physical activity, perspiration, and through general degradation by solar radiation the sunscreen preparation will slowly become less and less effective in preventing the transmission of ultraviolet light through the outer surface of the sensor. Gradually ultraviolet light will penetrate the sensor until it comes into contact with the photochromic ink. At that point the ink will become molecularly excited and will change colour to indicate that more sunscreen should be applied or that further exposure to sunlight should be limited. Where a pigment or composition of photochromic ink is used that changes colour only after a pre-determined level of ultraviolet exposure, as that pre-determined level of exposure is attained the ink will change colour to indicate that further sunscreen should be applied or that further exposure should be limited.

In an alternate embodiment, a number of different photochromic inks could be included in the same sensor to visually indicate a range of different levels of exposure to ultraviolet light. For example, the sensor may contain a photochromic ink that very rapidly changes colour upon only minimal exposure to ultraviolet light. The sensor may also include a second photochromic ink that changes colour only after a moderate level of exposure. A third photochromic ink, that changes colour at levels of ultraviolet exposure high enough to cause damage or burning of human skin, may also be included. Preferably each of the three inks are of different colours or different intensities. In this manner sensor 1 will thus provide a visual indication of when there has initially been ultraviolet exposure, when the level of exposure has reached a moderate level, and finally when there has been a high level of exposure. That is, the particular levels of ultraviolet exposure that cause excitation and colour changes in the inks can be chosen to represent progressive stages of exposure so as to provide a warning to an individual that the level of exposure is increasing and to indicate when the amount of exposure has reached a dangerous level.

According to the above structure, either the intensity of the ultraviolet radiation that has penetrated sensor 1, and/or the mere fact that sunlight has been able to penetrate the sensor, may be visually indicated by way of colour changes to indicator means 6, or through different intensities of colour. In any event, through visual indication an individual is provided with a means of identifying when he or she has been exposed to a level of ultraviolet radiation sufficient to transcend the sunscreen applied to the surface of sensor 1. Since the outer surface of sensor 1 effectively mimics the characteristics of human skin in so far as it is able to retain a topical sunscreen, as that sunscreen preparation slowly degrades the sunscreen preparation that has been applied to exposed areas of skin will similarly degrade. Indicator means 6 will therefore provide an effective measure of the amount of ultraviolet light, and hence ultraviolet radiation, to which other areas of exposed skin have been subjected. The colour, colours, or intensity of colour, of indicator means 6 will alert an individual to either limit further exposure to the sun or to re-apply additional sunscreen preparation. In the event that additional sunscreen preparation is re-applied to the skin and over the outer surface of sensor 1, to the extent that ultraviolet light is again unable to penetrate the boundary of sensor I and reach indicator means 6, the photochromic ink will return to its original colour or colourless form. The individual is then provided with a visual indication that the sunscreen preparation is once again effectively blocking ultraviolet light and that adequate protection has been achieved to prevent burning or skin damage.

It is to be understood that what has been described are the preferred embodiments of the invention and that it may be possible to make variations to these embodiments while staying within the broad scope of the invention. Some of these variations have been discussed while others will be readily apparent to those skilled in the art.

We claim:

1. An ultraviolet radiation sensor that may be worn on the skin to indicate exposure of the skin to ultraviolet radiation, the sensor comprising:
   (i) a transparent semi-permeable membrane having an upper and a lower surface;
   (ii) an adhesive capable of releasably adhering said semi-permeable membrane to human skin; and,
   (iii) indicator means to visually indicate exposure to ultraviolet radiation,
wherein said sensor, when attached to human skin by way of said adhesive, allowing for the migration of water vapour and gases from the surface of the skin through said sensor and into the atmosphere.

2. A device as claimed in claim 1 wherein said indicator means includes photochromic ink.

3. A device as claimed in claim 2 wherein said photochromic ink reacts to exposure to ultraviolet light through molecular excitation and thereby changes colour so as to indicate ultraviolet radiation exposure.

4. A device as claimed in claim 3 wherein said semi-permeable membrane is capable of absorbing a topical sunscreen preparation when applied thereto such that said photochromic ink is at least partially shielded from exposure to ultraviolet light by the sunscreen.

5. A device as claimed in claim 4 wherein said photochromic ink reverts to its original colour or colourless state when no longer exposed to ultraviolet light.

6. A device as claimed in claim 5 wherein said photochromic ink is contained within a carrier layer, said carrier layer comprising a semi-permeable material capable of absorbing and retaining said photochromic ink.

7. A device as claimed in claim 6 wherein said semi-permeable material is cellulose.

8. A device as claimed in claim 6 wherein said semi-permeable material is a polymer layer that is attached to said semi-permeable membrane, said photochromic ink being disbursed throughout said polymer layer.

9. A device as claimed in claim 6 wherein said carrier layer is embedded within and surrounded by said semi-permeable membrane.

10. A device is claimed in claim 6 formed from a lamination of a plurality of semi-permeable membranes, said carrier layer situated between adjacent layers of semi-permeable membranes.

11. A device is claimed in claim 4 including a plurality of photochromic inks, each of said photochromic inks reacting to different levels of exposure to ultraviolet light an providing visual indication of exposure to different levels of ultraviolet light.

12. A device as claimed in claim 4 wherein said photochromic ink is dispersed throughout said semi-permeable membrane such that said semi-permeable membrane undergoes a change of colour upon exposure to a ultraviolet light.

13. A device is claimed in claim 12 including a plurality of photochromic inks, each of said photochromic inks reacting to different levels of exposure to ultraviolet light an providing visual indication of exposure to different levels of ultraviolet light.

14. A device is claimed in claim 3 including a plurality of photochromic inks, each of said photochromic inks reacting to different levels of exposure to ultraviolet light an providing visual indication of exposure to different levels of ultraviolet light.

* * * * *